May 27, 1924.
G. JERLING
STEERING POST LOCK
Filed June 8, 1922
1,495,905
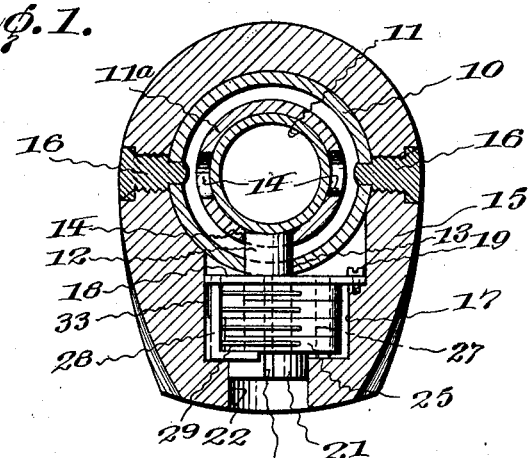
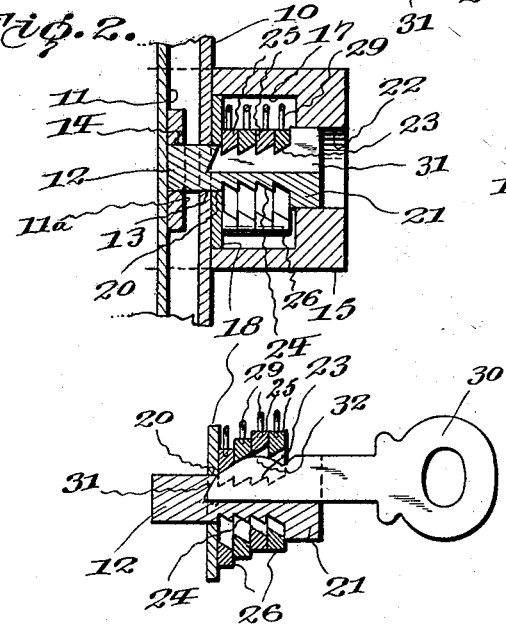
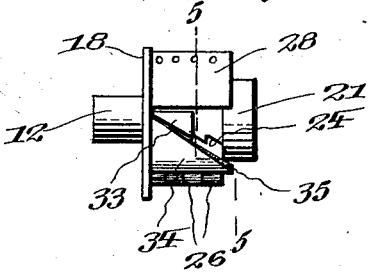
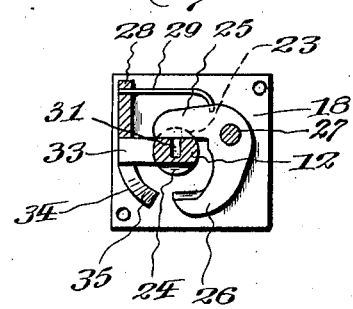
Inventor:
Gottfried Jerling.
Attorneys.

Patented May 27, 1924.

1,495,905

UNITED STATES PATENT OFFICE.

GOTTFRIED JERLING, OF CHICAGO, ILLINOIS, ASSIGNOR OF ONE-HALF TO FREDERICK E. HUMMEL, OF CHICAGO, ILLINOIS.

STEERING-POST LOCK.

Application filed June 8, 1922. Serial No. 566,817.

*To all whom it may concern:*

Be it known that I, GOTTFRIED JERLING, a citizen of Austria, residing at Chicago, in the county of Cook and State of Illinois, have invented new and useful Improvements in Steering-Post Locks, of which the following is a specification.

The lock which is the subject matter of the present application for patent has been designed more particularly for application to the steering gear of motor vehicles to prevent theft and the unauthorized use of the car. It will be understood however that the lock is not limited to any particular application, and it may be employed wherever a lock is required.

The invention has for its object to provide a lock in which the bolt has a sliding movement and is locked in advanced position by means of a novel and improved arrangement of key-controlled detents, as will be described in detail hereinafter.

In order that the invention may be better understood, reference is had to the accompanying drawing, wherein:

Figure 1 is a cross-section of the lock casing and the parts to which the same is applied; Fig. 2 is a central longitudinal section of the lock; Fig. 3 is a similar view showing the key and the method of operating the detents which lock the bolt; Fig. 4 is a side elevation showing the means whereby longitudinal movement of the bolt is effected, and Fig. 5 is a cross-section on the line 5—5 of Fig. 4.

Referring specifically to the drawing, 10 denotes the stationary tubular post which houses the shaft 11 of the steering wheel and is provided with suitable operating connections with the front wheels of the car. As these connections are well known and do not form a part of the present invention, they have not been illustrated. The bolt 12 of the lock is adapted to be passed through an aperture 13 in the post 10 to enter a keeper aperture 14 in a ring 11ª encircling the shaft 11 and rigidly secured thereto, and when this is done, said shaft is locked to prevent steering of the car and thus frustrate theft and unauthorized use of the car. The housing of the lock is shown at 15, it being shaped to encircle the post 10, and being secured thereto by screws 16 having their outer ends hammered flush with the housing and spread sidewise into grooves made in the holes of the housing wall through which the screws pass, to prevent removal of the screws. The housing 15 may be modified in various ways according to the parts to which the lock is to be applied. As pointed out hereinbefore, the application of the lock is not limited to the steering mechanism of motor vehicles, but it may be used wherever a lock is desired. The keeper aperture 14 will be so located as to come into alinement with the bolt 12 when the shaft 11 has been turned to set the front wheels of the car in straight ahead position, but the ring 11ª may be provided with a plurality of keeper apertures so that the shaft 11 may be locked with the wheels in other positions.

The wall of the housing 15 has a cavity 17 in which the bolt 12 is located. The inner end of this cavity is closed by a cover plate 18 secured by screws 19, and this plate has an aperture 20 through which the bolt protrudes to enter the aperture 13, said apertures being therefore in alinement. The outer end of the bolt has a head or enlargement 21 which seats in the reduced outer portion 22 of the cavity 17. The head 21 is sunk in the part 22 of the cavity 17 so that it does not protrude from the housing 15, this being for the purpose of preventing the bolt from accidentally being advanced to locking position by its outer end being struck by another object or by the hand of the driver.

The bolt 12 is slidable in the direction of its length in going to and from locking position, and in order to lock it in this position, it is provided on one side with a plurality of ratchet teeth 23 extending transversely. The diametrically opposite side of the bolt has a similar arrangement of ratchet teeth 24. Alongside the bolt is mounted a series of detents which are engageable with the ratchet teeth thereof. Each detent is double, it being provided with two angularly disposed branches or arms 25 and 26, respectively, the former being opposite the ratchet teeth 23 to engage one of the latter, and the arm 26 being opposite the ratchet teeth 24 to engage one of the latter. The detents are pivotally mounted in superposed relation on a post 27 carried by the plate 18, and this plate also carries a post 28 to which are attached springs 29 engageable at their free ends with the detents for holding them normally positioned so that their branches 25 engage the ratchet teeth 23 of the bolt. With the detents in this position, and the bolt advanced into the keeper aperture 14, the shaft 11 is locked and prevented from being rotated to steer the car. The function of the detent branches 26 will be presently described.

For the purpose of operating the detents to release the bolt 12 and allow the same to be retracted to unlock the shaft 11, a special key 30 has been provided. This key has a flat shank, and the bolt has a longitudinal groove 31 which is continued through the head 21, and is positioned to intersect the ratchet teeth 23. One of the edges of the key shank has a cam 32 of such design that when the key is inserted into the groove 31, said cam engages the detent branches 25 and swings the detents in a direction to take said branches clear of the ratchet teeth 23, thereby releasing the bolt 12 to permit the same to be retracted.

The key 30 is also employed for retracting the bolt 12 after it has been unlocked as hereinbefore described, and to enable this to be done, the bolt has a side lug or wing 33 which is positioned opposite a lug 34 carried by the plate 18. This lug has an inclined surface 35 extending obliquely with respect to the axis of the bolt. When the bolt, after the branches 25 of the detents are clear of the ratchet teeth 23, is given a rotary impulse by means of the key, in a direction causing the lug 33 to press against the incline 35, the bolt is caused to move in the direction of its length to leave the keeper aperture 14.

The branches 26 of the detents and the ratchet teeth 24 of the bolt 12 are provided to frustrate attempts to pick the lock. The spacing of the detent branches 25 and 26 is such that the branches 26 remain clear of the ratchet teeth 24 when the branches 25 are swung clear of the ratchet teeth 23 by means of the key 30 as hereinbefore described. However if an attempt should be made to pick the lock, and the person succeeded in disengaging one or even all of the detent branches 25 from the ratchet teeth 23, it is extremely unlikely that the detents could be swung to exact distance required to leave the branches 26 clear of the ratchet teeth 24. It is more than likely that the detents would be swung so far as to bring the branches 26 into engagement with the teeth 24, which would again lock the bolt. The detents have been so designed that a very slight movement beyond that required to take the branches 25 clear of the ratchet teeth 23 will bring the branches 26 into engagement with the ratchet teeth 24.

A key is not required for advancing the bolt 12 to locking position. To do this it is necessary only to push inwardly on the head 21, the ratchet teeth now slipping past the detents. It is therefore not necessary to use a key to lock the shaft 11. The springs 29 securely hold the detents so that jolts will not advance the bolt 12.

I claim:

1. In a lock, a slidable bolt having a longitudinal key groove and provided with transverse ratchet teeth which are intersected by the groove, pivoted detents engageable with the ratchet teeth for locking the bolt against a sliding movement, and a key insertable into the aforesaid groove and having a cam edge for forcing the detents clear of the ratchet teeth.

2. In a lock, a slidable bolt having a longitudinal key groove and provided with transverse ratchet teeth which are intersected by the groove, pivoted detents engageable with the ratchet teeth, a key insertable into the aforesaid groove and having a cam edge for forcing the detents clear of the ratchet teeth, a laterally projecting wing on the bolt, and a stationary incline engageable by the wing for moving the bolt in the direction of its length when it is rotated in a direction to press said wing against the incline.

3. In a lock, a slidable bolt having a longitudinal key groove and provided with transverse ratchet teeth which are intersected by the groove, pivoted detents engageable with the ratchet teeth, a key insertable into the aforesaid groove and having a cam edge for forcing the detents clear of the ratchet teeth, a laterally projecting wing on the bolt, and a stationary incline engageable by the wing for moving the bolt in the direction of its length when it is rotated in a direction to press said wing against the incline, said bolt being rotatable by the key.

4. In a lock, a slidable bolt having a longitudinal key groove and provided with transverse ratchet-teeth on opposite sides, said teeth on one side of the bolt being intersected by the key groove, pivoted detents engageable with the last-mentioned ratchet teeth, and a key insertable into the key groove and having a cam edge for forcing the detents clear of said ratchet teeth, said detents having branches opposite the ratchet teeth on the other side of the bolt and engageable therewith upon a movement of the detents exceeding that required to take the aforesaid key-operated detents clear of the ratchet teeth with which they are engageable.

5. In a lock, a slidable bolt having a longitudinal key groove and provided with transverse ratchet teeth on opposite sides, said teeth on one side of the bolt being intersected by the key groove, pivoted detents engageable with the last-mentioned ratchet teeth, a key insertable into the key groove and having a cam edge for forcing the detents clear of said ratchet teeth, said detents having branches opposite the ratchet teeth on the other side of the bolt and engageable therewith upon a movement of the detents exceeding that required to take the aforesaid key-operated detents clear of the ratchet teeth with which they are engageable, a laterally projecting wing on the bolt, and a stationary incline engageable by the wing for moving the bolt in the direction of its length when it is rotated in a direction to press said wing against the incline.

6. In a lock, a slidable bolt having a longitudinal key groove and provided with transverse ratchet teeth on opposite sides, said teeth on one side of the bolt being intersected by the key groove, pivoted detents engageable with the last-mentioned ratchet teeth, a key insertable into the key groove and having a cam edge for forcing the detents clear of said ratchet teeth, said detents having branches opposite the ratchet teeth on the other side of the bolt and engageable therewith upon a movement of the detents exceeding that required to take the aforesaid key-operated detents clear of the ratchet teeth with which they are engageable, a laterally projecting wing on the bolt, and a stationary incline engageable by the wing for moving the bolt in the direction of its length when it is rotated in a direction to press said wing against the incline, said bolt being rotatable by the key.

7. In a lock, a slidable bolt having a longitudinal key groove and provided with transverse ratchet-teeth which are intersected by the groove, pivoted detents engageable with the ratchet teeth for locking the bolt against a sliding movement, a key insertable into the aforesaid groove and having a cam edge for forcing the detents clear of the ratchet teeth, and means operable by a rotary movement of the bolt for sliding same in the direction of its length.

In testimony whereof I affix my signature.

GOTTFRIED JERLING.